US006881016B2

(12) United States Patent
May

(10) Patent No.: US 6,881,016 B2
(45) Date of Patent: Apr. 19, 2005

(54) CORE RETAINER

(76) Inventor: James L. May, 124 Ward St., Independence, MO (US) 64050

( * ) Notice: Subject to any disclaimer, the term of this patent is extended or adjusted under 35 U.S.C. 154(b) by 133 days.

(21) Appl. No.: 10/395,625

(22) Filed: Mar. 24, 2003

(65) Prior Publication Data

US 2004/0191014 A1 Sep. 30, 2004

(51) Int. Cl.[7] .................................................. B23G 11/00
(52) U.S. Cl. .......................................... 408/67; 408/204
(58) Field of Search .................... 408/67, 204; 175/232, 175/239, 249

(56) References Cited

U.S. PATENT DOCUMENTS

| | | | |
|---|---|---|---|
| 1,008,904 A | | 11/1911 | Harden et al. |
| 1,364,254 A | | 1/1921 | Currier |
| 1,876,379 A | * | 9/1932 | Winterburn .................. 175/251 |
| 2,044,057 A | | 6/1936 | Burt |
| 2,070,370 A | | 2/1937 | Miller |
| 2,372,875 A | * | 4/1945 | Benke .......................... 175/78 |
| 2,769,614 A | | 11/1956 | Zeni |
| 2,911,859 A | | 11/1959 | Longley et al. |
| 3,353,457 A | | 11/1967 | Fischer |
| 3,461,192 A | | 8/1969 | DiStasio |
| 3,880,546 A | | 4/1975 | Segal |
| 3,886,242 A | | 5/1975 | McGregor |
| 4,279,551 A | * | 7/1981 | Wilterding .................... 408/67 |
| 5,171,111 A | * | 12/1992 | Kishimoto .................... 408/67 |
| 5,325,930 A | | 7/1994 | Harrison |
| 5,352,071 A | * | 10/1994 | Cochran et al. ............ 408/204 |
| 5,393,175 A | * | 2/1995 | Courville ...................... 408/56 |
| 5,651,646 A | | 7/1997 | Banke et al. |
| 5,919,010 A | * | 7/1999 | Fonseca ....................... 408/67 |
| 6,089,335 A | | 7/2000 | Able |
| 6,171,032 B1 | | 1/2001 | Forche et al. |
| 6,206,616 B1 | | 3/2001 | Smith et al. |

FOREIGN PATENT DOCUMENTS

| | | | | |
|---|---|---|---|---|
| EP | 480263 A1 | * | 4/1992 | ........... B23B/51/04 |
| EP | 522202 A1 | * | 1/1993 | ........... B23B/51/04 |
| JP | 02108787 A | * | 4/1990 | ........... E21B/25/00 |
| JP | 02311212 A | * | 12/1990 | ........... B23B/51/05 |
| WO | WO 9421409 A2 | * | 9/1994 | ........... B23B/51/04 |

* cited by examiner

Primary Examiner—Daniel W. Howell
Assistant Examiner—Jamila O Williams
(74) Attorney, Agent, or Firm—Chase Law Firm, L.C.

(57) ABSTRACT

A core retainer includes a base plate releasably attached to a concrete floor from which a concrete core is to be removed. A brake assembly atop the plate includes a plurality of brake pads for contact with the interior of the core drill bit. The retainer is configured to fit within the core drill bit and either rotate with the core drill bit or be stationary relative thereto. Upon drilling, the plate and separated core fall to the floor below. This movement is translated to the brake assembly by the linkage such that the brake pads engage the core drill bit at a sufficient pressure allowing for the separated core to be retained within the core drill bit.

20 Claims, 3 Drawing Sheets

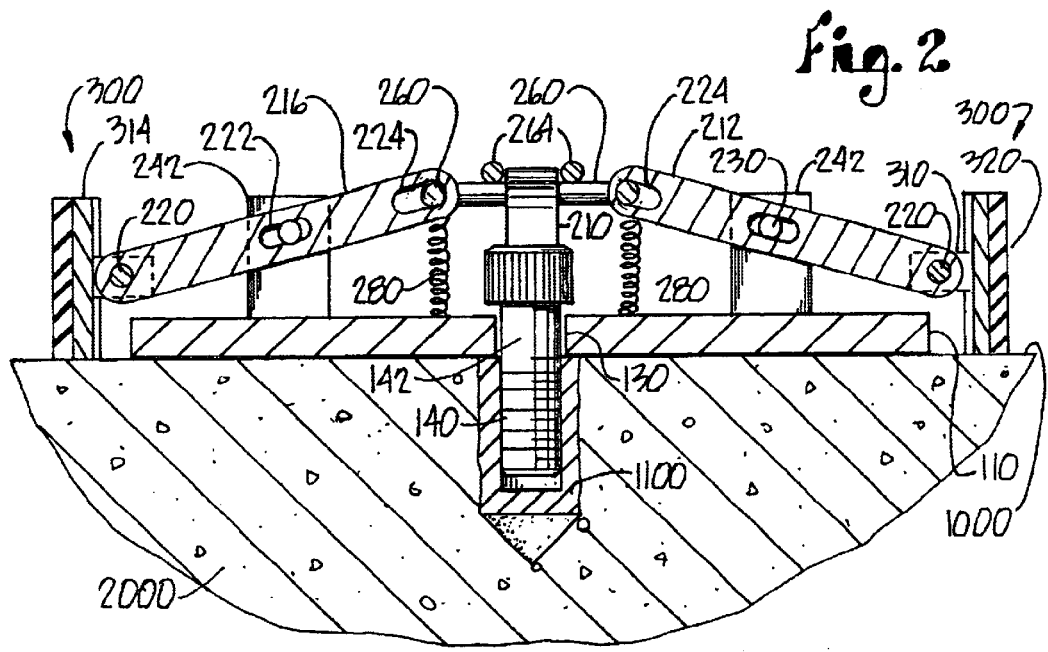
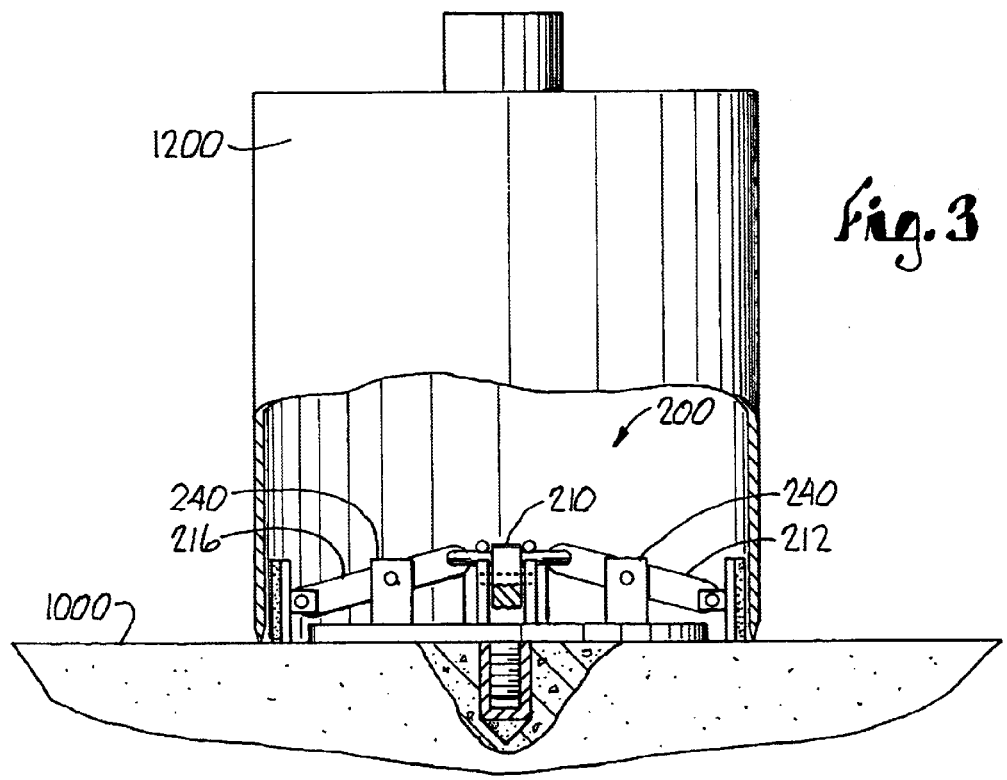

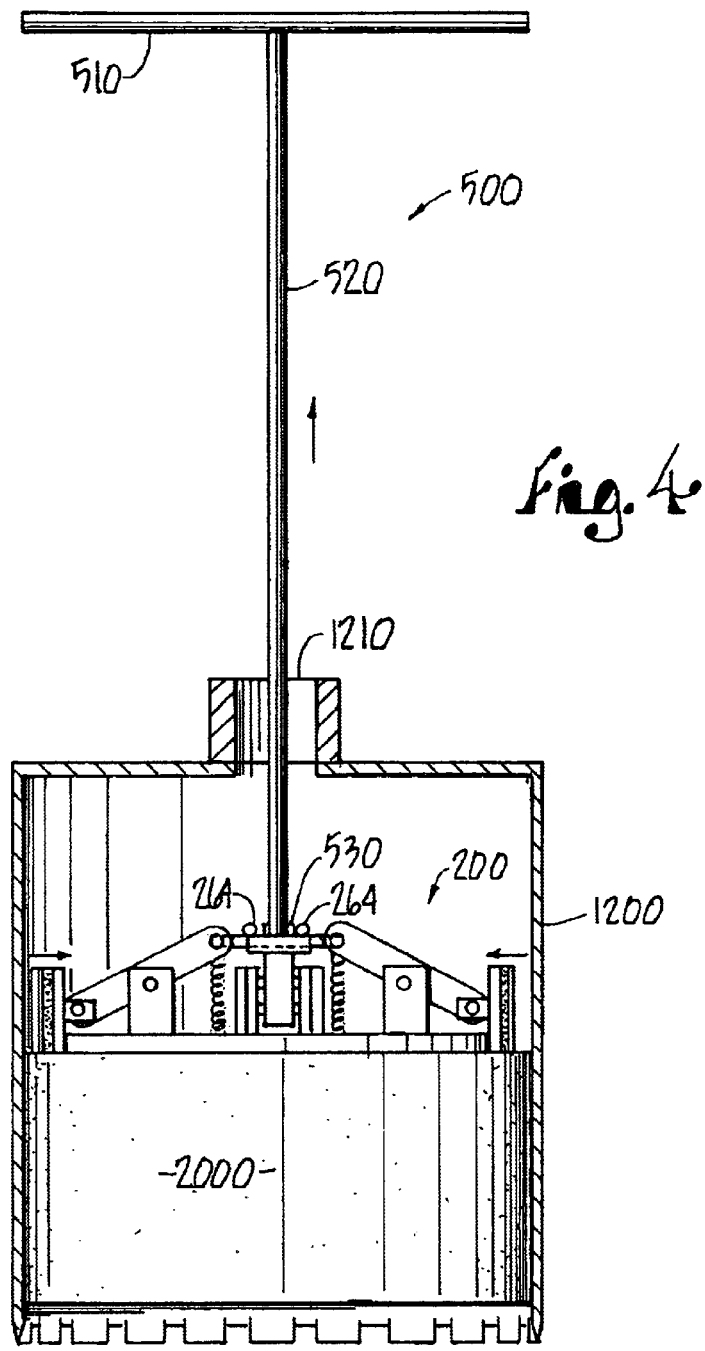
fig. 4
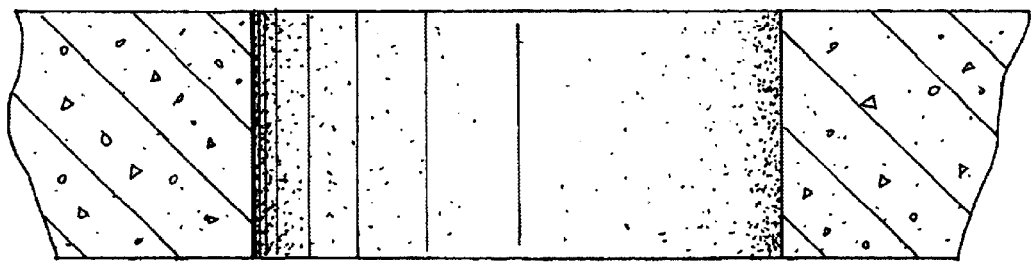

CORE RETAINER

BACKGROUND OF THE INVENTION

This invention relates to a core drilling device and, more particularly, to a device for retaining a core separated from a material surface due to the drilling process.

During building construction, the floors of the building are poured prior to the installation of the service utilities, such as waste stacks, plumbing, electricity and the like. After such installation, a worker must drill a hole in the concrete floor to allow passage for the particular utility therethrough. This drilling function results in a concrete core being separated from the floor which falls to the floor below. Notwithstanding the safety hazards associate with these falling cores, the worker must then gather up the cores on each floor. Thus, extra labor time results.

In response thereto I have invented a core retainer which precludes the separated core from falling to the lower floor. My device generally comprises a base plate releasably secured to the concrete floor. Atop the plate are a plurality of pivot arms having at their ends brake pads which are adapted to engage the interior of the core drill bit. Upon drilling, the separated core begins to drop therebelow. However, a contact of the brake pads with the interior of the core drill bit retains the separated core within the core drill bit. The user then withdraws the drill bit and separated core, as retained therein, from the surrounding floor. A tool then displaces the brake pads from the interior wall of the core drill bit which allows for release of the separated core. My core retainer can be designed so as to currently rotate with the core drill bit or be independent of the drill bit rotation. In both embodiments, the braking effect of the brake pads against the core drill bit retains the separated core within the core drill bit.

It is therefore a general object of this invention to provide a core retainer device for use with a core drill bit, the core retainer maintaining the separated core with the core drill bit.

A further object of this invention is to provide a device, as aforesaid, which is responsive to the weight of the separated core.

Another object of this invention is to provide a device, as aforesaid, which utilizes a plurality of brake pads for engagement with the core drill bit so as to maintain the separated core with the core drill bit.

Another object of the invention is to provide a device, as aforesaid, which can be designed for movement with the rotating core drill bit or be separated from the movement thereof.

A further object of this invention is to provide a device, as aforesaid, having a tool to enhance the removal of the separated core from the core drill bit.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 2 is a side elevation view of the retainer as taken along lines 2—2 of FIG. 1;

FIG. 3 is a view showing the brake pads located at the end of the pivot arms of the core retainer in contact with a core drill bit interior wall;

FIG. 4 is a view illustrating the use of the tool for release of the separated core from the core drill bit.

DESCRIPTION OF THE PREFERRED EMBODIMENT

Figure 1:
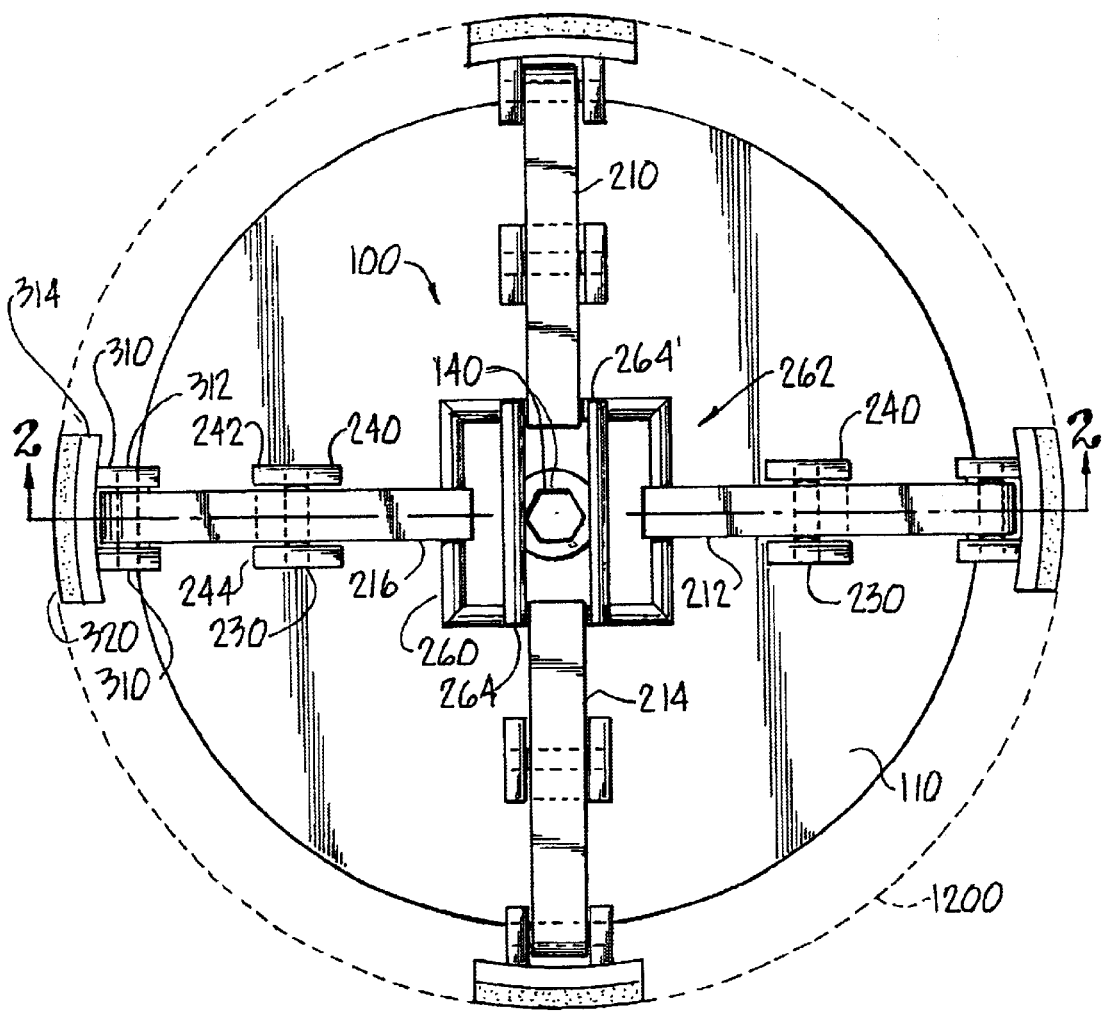
FIG. 1 is a top view of the core retainer as surrounded by a core drill bit.

Turning more particularly to the drawings, my core retainer 100 generally comprises a base plate 110 with a brake assembly 200 mounted thereon. The base plate 110 is generally circular in configuration having a diameter adapted to fit within the confines of a chosen core drill bit 1200. A central aperture 130 within the plate 110 allows for extension of a retaining bolt 140 therethrough.

The brake assembly 200 includes a plurality of pivot arms 210, 212, 214, 216 with each pivot arm having apertures 220, 222, 224 therein. Each pivot arm is pivotably mounted about a pin 230 extending through elongated aperture 222 and walls 242, 244 of a bracket 240 extending from the base plate 110.

The first end of each pivot arm has a pin 260 extending through an elongated aperture 224 with each pin 260 connected together to form a frame 262 displaced above base plate 110. Atop the frame 262 are cross bars 264 with a space therebetween for a pose to be subsequently described. At the opposed second end of each pivot arm is mounted a brake pad assembly 300. Pin 320 extends through flanges 310 and the aperture 320 at the end of each arm. A mounting plate 314 receives a rubber brake pad 320 thereon configured to trace the interior of the core drill bit. Accordingly, each brake pad assembly 300 is pivotably mounted at the end of each respective pivot arm with such pivotal movement assuring that the brake pads 320 move into contact with the interior of the core drill bit 1200.

Extending between each corner of frame 262 and base plate 110 is a linkage assembly in the form of springs 280 which bias the frame 262 and the associated first end of each pivot arm towards the base plate 110. Accordingly, the brake pads 320 are biased into movement toward contact with the core drill bit 1200. The dimensions of the pivot arms are chosen so that they will fit atop the base plate 110 and within the confines of the chosen core drill bit 1200. The length of the pivot arms and/or spring 280 bias may be chosen such that the brake pads 320 will either initially bear against the interior of the core drill bit 1200 or in an alternative embodiment be displaced therefrom.

Upon selecting the material surface 1000 from which the core 2000 is to be separated, an anchor 1100 is driven into the material surface coinciding with the center point of the to-be-separated core 2000. The user threadably extends a bolt 140 through the base plate 110 aperture 130 and threadably engages the bolt 140 with anchor 1100. As such, the base plate 100 is joined to the adjacent material surface 1000 which is rotatable about the non-threaded portion 142 of the bolt 140. A spacer, such as a washer or the like, may be used so as to displace the base plate 110 from the adjacent material surface 1000 to preclude friction therebetween.

In a first embodiment, the pivot arms are chosen such that the brake pads 320 of the brake pad assemblies 300 initially bear against the inside of the core drill bit 1200 as urged thereto by springs 280. Accordingly, upon rotation of the core drill bit 1200 the core retainer 100 will rotate therewith. Upon the core drill bit penetrating the depth of the material surface 1000, the produced core 2000 will separate from surface 1000 and start to drop to the floor below the penetrated material surface 1000. At this point the base plate 110, being attached to the core 2000, concurrently moves with the core 2000. This movement is translated to the pivot arms as linked thereto by springs 280 and/or brackets 240. (It is understood that other types of linkage may be used such as linkage arms, rods, etc.) The resulting pivot arm movement, as springs 280 seek their normal positions, further urges the brake pads 320 against the interior of the core drill bit 1200 at a sufficient pressure so as to retain the separated core 2000 within the confines of the core drill bit 1200. (It is understood that the initial pressure of the brake pads 320 may alone be sufficient to retain the separated core 2000 within the core drill bit 1200.) Accordingly, a user displacement of the core drill bit 1200 from the material surface 1000 will concurrently displace the separated core 2000 from the material surface 1000.

Subsequently, it is necessary to remove the captured core 2000 from the drill bit 1200. To enhance such removal, tool 500 is provided, including a handle 510, shaft 520 and a rectangular lug 530. Lug 530 is dimensioned to allow insertion through the aperture 1210 of the core drill bit and through the space between the cross bars 264 atop the frame 262. Upon a 90° rotation of the lug 530 the lug 530 will bear against the underside of cross bars 264. An upward user manipulation of the tool 500 displaces the frame 262 away from the base plate 110 which moves the pivot arms and the attached brake pads 320 in a direction such that the bearing pressure of the brake pads 320 is released from the interior wall of the core drill bit 1200. The elongated configuration of the apertures 222 and/or 224 in each pivot arm allow for such movement. Upon such release the core 2000 can be separated from the drill bit 1200. The core retainer 100 can then be separated from the core 2000 by disengagement of bolt 140 from anchor 1100 for subsequent use.

In an alternative embodiment, the pivot arms of the core retainer 100 are chosen and/or positioned such that the brake pads 320 are either displaced from the interior of the core drill bit 1200 or at a pressure such that rotation of the drill bit 1200 will be independent of the core retainer 100. Upon separation of the core 2000 from the material surface 1000, the movement of the base plate 110 with the separated core 2000 is translated, via the intermediate linkage, to brake pad movement into contact with the interior of the core drill bit 1200 so as to capture the core 2000 therein. Accordingly, the core 2000 can then be displaced from the surrounding surface 1000 and removed as above described.

It is thus understood that my retainer 100 can be designed such that the brake pad 320 engagement will either cause rotation of the retainer 100 with the core drill bit 1200 or be independent therefrom.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A core retainer adapted for use with a core drill bit, the core drill bit for separation of a core from a material surface, said retainer comprising:
   a base plate;
   means for connecting said base plate to the material surface;
   a plurality of arms mounted to said base plate, each arm having a first end and a second end;
   means for linking movement of each said arm to said base plate, whereupon a movement of said base plate moves said arms;
   a brake pad at said first end of each said arm, said brake pad adapted to engage an interior surface of the core drill bit;
   a rotatable drilling of the core drill bit into the material surface producing a separated core in movement from the material surface, the separated core movement moving said base plate connected thereto, said base plate movement moving said arms linked thereto to a position wherein to urge said brake pads against the interior surface of the core drill bit at a pressure to hold said retainer and separated core with the core drill bit, whereby a displacement of the core drill bit from the material surface displaces the separated core therefrom.

2. The device as claimed in claim 1 wherein said arm movement is a pivotal arm movement.

3. The device as claimed in claim 1 wherein said linking means includes a spring extending between said second end of each arm and said plate, said spring urging said first end of each arm to said position urging said brake pad against the core drill bit.

4. The device as claimed in claim 1 further comprising means for releasing the separated core from the core drill bit.

5. The device as claimed in claim 4 wherein said releasing means comprises a tool for urging said arms in movement to displace said brake pads from the interior surface of the core drill bit.

6. The device as claimed in claim 1 wherein said connecting means comprises:
   a female element positioned in the material surface;
   a male element extending through said base plate for connection with said female element.

7. The device as claimed in claim 1 further comprising:
   a frame comprising a plurality of connected pins, one of said pins extending through a respective second end of each said arm;
   said linking means comprising a plurality of springs extending between said frame and said base plate, said springs urging each said second end of said respective arm in movement about said respective pin, whereby to urge said each said arm into movement whereby each said brake pad bears against the interior of the core drill bit.

8. The device as claimed in claim 7 further comprising:
   a bracket on said base plate for each said arm;
   a second pivot pin extending through each said bracket and pivot arm between said first and second ends thereof for pivotal movement of each said arm about said respective second pivot pin.

9. The device as claimed in claim 7 wherein movement of said frame away from said base plate moves said arms in a manner to displace the brake pads from the core drill bit, whereby to free the core therefrom.

10. The device as claimed in claim 9 further comprising a tool, said tool insertable within the frame, a manipulation of the tool by a user moving said frame in said movement away from said base plate.

11. The device as claimed in claim 1 wherein said brake pads initially engage the core drill bit, the rotatable drilling of the core drill bit concurrently rotating said retainer therewith, said base plate movement maintaining said brake pads against the interior of the core drill bit.

12. The device as claimed in claim 1 wherein said brake pads are adjacent the interior surface of the core drill bit wherein the rotatable drilling of the core drill is independent of movement of said retainer, said base plate movement urging said brake pads against the interior of the core drill bit into an engagement whereby to maintain the separated core therewith.

13. A core retainer adapted for use with a core drill bit, the core drill bit for separation of a core from a material surface, said retainer comprising:

a base plate;

means for connecting said base plate to the material surface;

a brake assembly mounted to said base plate, said brake assembly including a plurality of brake pads adapted to engage an interior surface of the core drill bit;

means for linking movement of said brake pads to said base plate;

a drilling of the core drill bit into the material surface producing a separated core connected to said base plate, wherein the engagement of said brake pads against the interior surface of the core drill bit hold said retainer and the connected separated core within the core drill bit, a displacement of the core drill bit from the material surface displacing the separated core therefrom.

14. The device as claimed in claim 13 wherein said brake pads initially engage the interior surface of the core drill bit, the separated core producing a movement of said base plate and brake pads linked thereto into an enhanced engagement with the core drill bit.

15. The device as claimed in claim 13 wherein said brake pads are initially displaced from the core drill bit, said separated core moving said base plate whereby said linking means urges said brake pads into engagement with the core drill bit.

16. The device as claimed in claim 13 wherein said base plate is releasably connected to the material surface.

17. The device as claimed in claim 13 further comprising means for removing the separated core from said engagement with the drill bit.

18. A core retainer adapted for use with a core drill bit, the core drill bit for separation of a core from a material surface, said retainer comprising:

a base plate;

means for releasably connecting said base plate to the material surface;

a plurality of arms mounted relative to said base plate, each arm having a first end and a second end;

a brake pad at said first end of each said pivot arm;

means for urging movement of each said arm to a position wherein each said brake pad is adapted to engage an interior surface of the core drill bit, said urging means responsive to movement of said base plate and core connected thereto;

a drilling of the core drill bit into the material surface producing a separated core in movement away from the material surface, the separated core movement moving said base plate connected thereto, said urging means responsive to said base plate movement for urging said arms and said brake pads into an engagement against the interior surface of the core drill bit sufficient to hold said retainer and the connected separated core within the core drill bit, whereby a displacement of the core drill bit from the material surface displaces the separated core therefrom.

19. The device as claimed in claim 18 wherein said brake pads are initially adjacent the interior of the core drill bit, said movement of said base plate and core causing said urging means to move said brake pads to a position sufficiently contiguous with the interior surface of the core drill bit to hold said retainer and the separated core therein.

20. The device as claimed in claim 18 wherein said urging means comprises means extending between said second end of each arm and said plate for biasing each arm second end towards said base plate.

* * * * *